Patented Feb. 2, 1926.

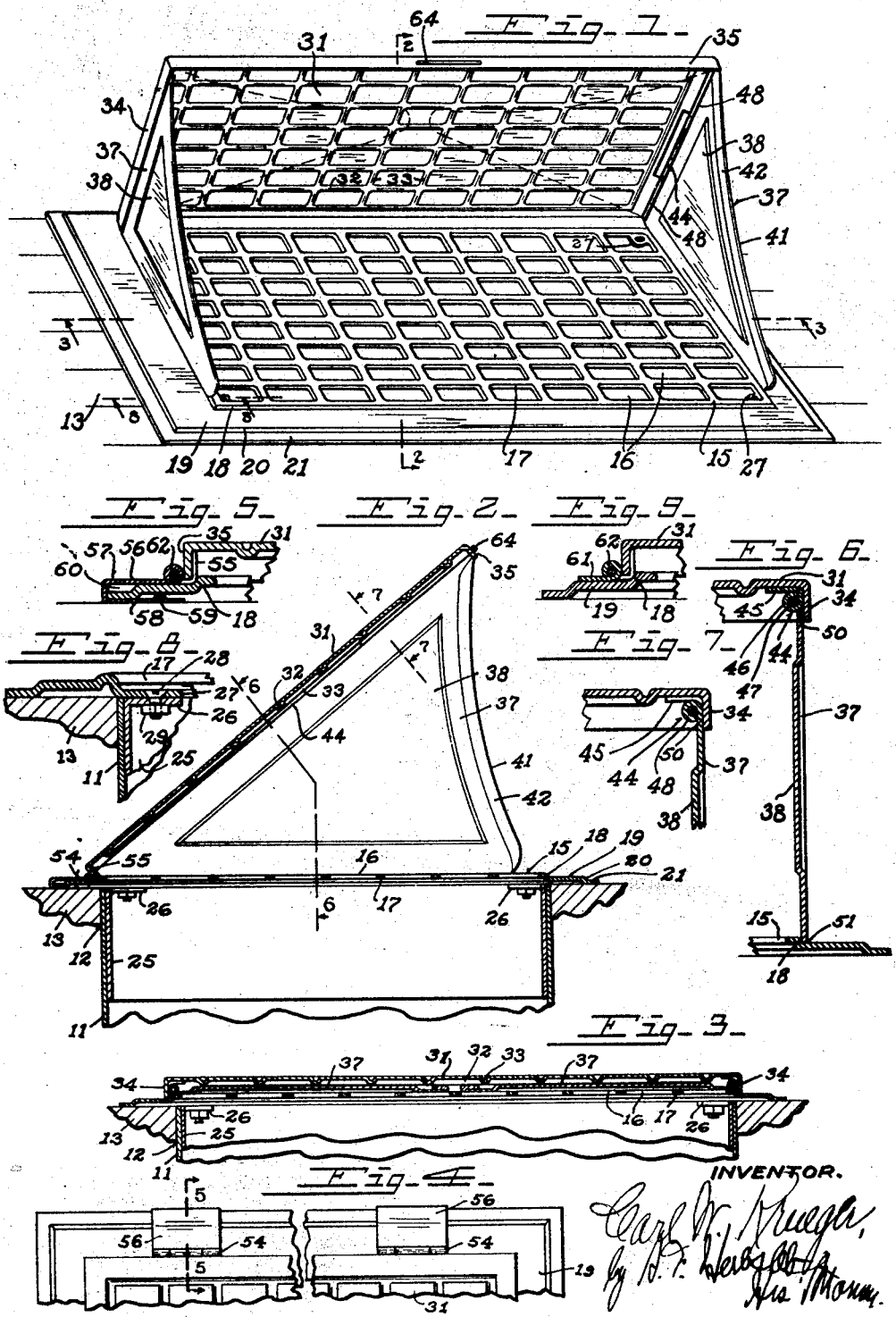

1,571,631

UNITED STATES PATENT OFFICE.

CARL W. KRUEGER, OF NORWOOD, OHIO.

COMBINED DEFLECTOR AND COVER FOR HEATED-AIR REGISTERS.

Application filed January 17, 1924. Serial No. 686,911.

*To all whom it may concern:*

Be it known that I, CARL W. KRUEGER, a citizen of the United States, residing at Norwood, in the county of Hamilton and State of Ohio, have invented certain new and useful Improvements in Combined Deflectors and Covers for Heated-Air Registers, of which the following is a specification.

My invention relates to deflectors and covers for use in connection with registers of warm air or hot air heating systems.

It is the object of my invention to provide a deflector which is collapsible, and which, when collapsed, serves as a cover for the register; further, to provide a deflector comprising end-walls which are hinged to the body of the deflector and are arranged to be supported laterally by the body, and which are preferably so related to the register that the end-walls are braced by the register-plate in order to sustain the body in inclined relation; and, further, to hinge the end-walls to the body so that the end-walls may be arranged parallel with the body and the body lowered upon the register to form a cover therefor.

The invention will be further readily understood from the following description and claims, and from the drawing, in which latter:

Fig. 1 is a perspective view of my improved device, in set-up position for serving as a deflector.

Fig. 2 is a cross-section of the same, taken on the line 2—2 of Fig. 1.

Fig. 3 is a longitudinal section of the same, taken in the plane of the line 3—3 of Fig. 1, but showing the cover lowered.

Fig. 4 is a plan view detail, showing the hinge arrangement between the body and the register-plate.

Fig. 5 is a cross-section of the same, taken on the line 5—5 of Fig. 4.

Fig. 6 is a longitudinal section showing a detail of the device in set-up position and its support upon the register-plate, and taken on the irregular line 6—6 of Fig. 2.

Fig. 7 is a cross-sectional detail of the hinging means between the end-wall and the body, taken on the line 7—7 of Fig. 2.

Fig. 8 is a cross-sectional detail, taken on the line 8—8 of Fig. 1; and,

Fig. 9 is a cross-sectional detail, taken on a line corresponding to the line 5—5 of Fig. 4, but showing a modification in that the hinge of the cover is fixed to the register-plate.

I have exemplified my invention as applied to a floor register. The heating pipe through which the heated air is arranged to enter the room is exemplified at 11, and is shown in a hole 12 in the floor 13 of the room.

A register-plate 15 is provided with openings 16, through which the heated air is arranged to pass from the heating pipe into the room, the openings being formed to leave supporting walls 17 in the plate, about which there is a shoulder 18 extending above a margin 19 around the same, this margin having a shoulder 20 adjacent to its outer edge extending upwardly from an outer marginal surface 21 about the floor register-plate. The margins and shoulders are shown at the respective ends and sides of the register-plate, the register-plate being shown as of rectangular form.

A ferrule 25 extends into the heated-air pipe, and the corners thereof are respectively provided with inwardly extending flanges 26. The register-plate is provided with a flange 27 at each of its corners, a screw 28 being received through holes in the flanges 26, 27, at the respective corners, and having a nut 29 over its threaded end for clamping the register-plate to the ferrule.

The combined deflector and cover comprises a body, which consists of a transverse plate 31, preferably formed with strengthening beads, shown as lengthwise beads 32 and cross beads 33, the beads preferably extending downwardly. The body is also preferably provided with marginal flanges 34 at its ends and marginal flanges 35 at its front and rear edges, these marginal flanges extending downwardly and being preferably at right angles to the plane of the plate. The beads of the body aid in strengthening the body and preventing undesirable bending.

End-walls 37 are hinged at the respective ends of the body. These end-walls are preferably provided with inwardly bent portions 38 for strengthening the end-walls and arranged to be contacted by the downwardly extending beads of the body when the end-walls and body are lowered, for forming support for the body.

The end-walls are preferably of general triangular form, having curved outer ends 41, at which the margin of the end-wall is infolded to form a flange 42 upon which the beads of the body also find support. One of the edges of each of the end-walls is articulated with the body, as by a hinge 44, which is shown as comprising a butt 45, received in the corner between the plate of the body and the end-flange, and fixed to the under face of the plate, as by spot-welding the same thereto, and provided with a knuckle 46 for the pintle 47 of the hinge. The upper edge of each of the end-walls is provided with a knuckle 48 located in the projection of the knuckle 46 and receiving the pintle 47 of the hinge.

The pivotal axis of the hinge is preferably located within the cover between the outer end of the flange and the top plate of the cover, and close to the flange, so that the outer portion 50 of the end-wall adjacent to the hinge has bearing upon the inner face of the flange, when the deflector is in set-up relation, for instance, as exemplified in Fig. 6. When in such set-up relation, the lower end 51 of each of the end-walls is received outside the end-shoulder 18 of the register-plate. Each of the end-walls is therefore supported in both directions to prevent collapse of the device when used as a deflector, the lateral movement in one direction being prevented by the flange 34 and in the other direction by the shoulder 18, the flanges 34 and the shoulders 18 respectively acting in opposite directions upon the pair of end-walls, to form a rigid structure when the parts are in set-up relation.

The body is hinged to the register-plate, preferably by hinges 54, one of the butts 55 of each of which is fixed to the inner face of the proximate flange 35, and the other butt 56 thereof being formed as a clip 57 having a lower flange 58 preferably provided with a hump 59, and forming a space 60 into which the margin of the register-plate is received. The construction is such that the flange 58 may be slipped under the margin of the register-plate, the hump aiding in holding the parts in place. The clip is preferably a spring clip for holding the combined deflector and cover to the register-plate.

If desired, the hinge may be provided with a butt 61 fixed to the margin 19 of the register-plate, as by spot-welding, for fixing the combined deflector and cover to the register-plate, for instance, as shown in Fig. 9. In either case, whether a spring-clip hinge is used, as shown in Figs. 2, 4 and 5, or a fixed butt hinge is used, as shown in Fig. 9, the pintle 62 of the hinge is preferably adjacent to the inner shoulder 18 of the register-plate.

When my improved device is used as a cover, that is, in collapsed relation, the marginal flanges 34, 35, of the body preferably surround or are received about the shoulders 18 for positioning the body with relation to the register-plate, an exemplification of which is shown in Fig. 3.

When my improved device is formed into collapsed relation, the end-walls are moved inwardly, for instance, as shown in dotted lines in Fig. 1, and the body is lowered, with the flanges thereof received in close relation about the inner shoulders 18 of the register-plate, and with the outer faces of the end-walls resting upon the register-plate, and the reinforcing beads of the body resting upon the end-walls, so that a person stepping on the cover will be supported by the body, the end-walls and the register-plate.

The construction of the body and of the end-walls further aids in reinforcing the parts, and the configuration of the body also avoids the appearance of marring the upper surface of the body due to wear thereof by walking thereover.

My improved device is further such that if a person should accidentally kick the device, it will collapse in preference to being kicked bodily across the floor.

The body may also be provided with a grip 64, which may readily receive the fingertips thereunder, for readily raising the body, the end-walls dropping downwardly automatically into place for the raised position of use of the deflector.

My device is extremely simple, strong and durable, and is readily applied to and removed from register-plates in use after the same have been installed, or fixed to register-plates.

My improved device has the further advantages that, when the register is closed thereby, it avoids the entrance of dirt and dust through the register-plate into the heating system, and furthermore, the body and end-walls, when the device is in set-up relation, direct the heated air away from adjacent walls, and the device may be so placed that the current of heated air is projected into the room.

Having thus fully described my invention, what I claim as new, and desire to secure by Letters Patent, is:

1. In combination with a register-plate, a combined deflector and cover which comprises a body, hinging means between one of the side edges of said body and said register-plate, end walls of general triangular form articulated at one of their edges to the respective ends of said body, and hinges so articulating said end-walls to said body, said first-named hinging means and said second-named hinges having pivoted axes substantially perpendicular to each other, the hinged ends of said end-walls and said body formed with limiting portions to limit outward movements of said end-walls at substantial right angles to said body, said register-plate provided with end-shoulders against which the lower ends of said end-walls are arranged to contact to limit approach between said end-walls when in set-up relation, and whereby said first-named limiting means and said shoulders respectively act in limiting manner in opposite directions at the respective ends of said body and said deflector-plate.

2. In combination with a register-plate having register-openings and a marginal flange, a combined deflector and cover comprising a body and end-walls, said end-walls being of general triangular form, hinging means between one edge of the latter respectively and the respective ends of said cover, whereby said end-walls are arranged to be infolded with relation to said body and to be located between said register-plate and said body when said combined deflector and cover is in collapsed relation, and released hinging means secured to said cover and comprising clips having double walls releasably received about the upper and lower faces of said marginal flange of said register-plate.

3. In combination with a register-plate provided with marginal shoulders, a combined deflector and cover comprising a body having downwardly turned marginal flanges, and end-walls pivoted to said body within said flanges, said body and said end-walls provided with strengthening beads, said end-walls arranged to be folded inwardly within said flanges and to be supported by the upper face of said register-plate and said body supported by said end-walls, with the lower ends of said flanges received about said marginal shoulders of said register-plate when said combined deflector and cover is in collapsed relation.

In testimony whereof, I have hereunto signed my name.

CARL W. KRUEGER.